J. B. MABURY.
Heating Stove.
No. 14,461.
Patented March 18, 1856.
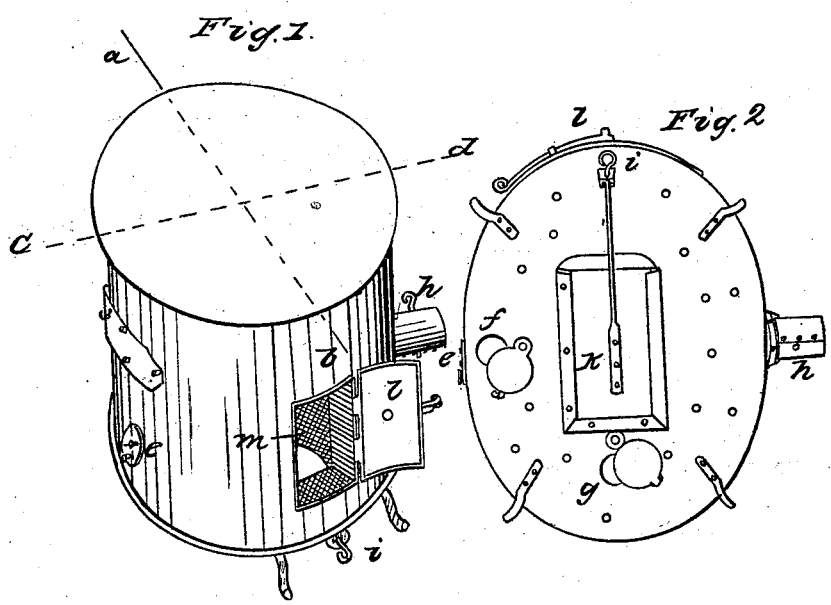
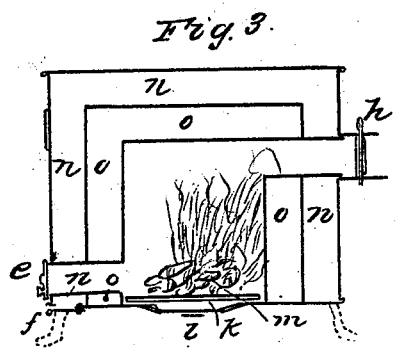
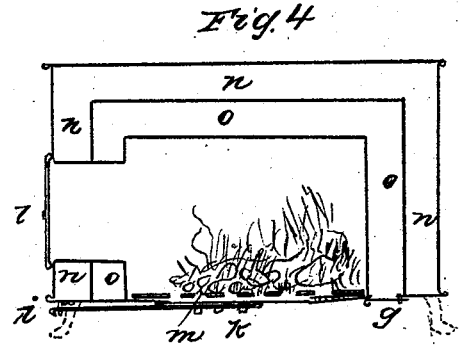

UNITED STATES PATENT OFFICE.

JAS. B. MABURY, OF JEFFERSONVILLE, INDIANA.

STOVE.

Specification of Letters Patent No. 14,461, dated March 18, 1856.

*To all whom it may concern:*

Be it known that I, JAMES B. MABURY, of Jeffersonville, in the county of Clarke, in the State of Indiana, have invented a new and Improved Stove; and I do hereby declare that the following is a full and exact description thereof, reference being had to the accompanying drawings and to the letters of reference marked thereon.

The nature of my invention consists in controlling the radiant heat to be derived from the stove independently of the fire burning within, by employing as one of the materials of construction of the stove atmospheric air, and confining it within the shells incasing it in such a way as to admit the expulsion of the heated and compressed air, but in the meantime to dispense with the creation of a hot air-current.

To enable others skilled in the art to make and use my invention, I will proceed to describe its construction and operation.

I construct my stove in any of the known forms and besides the atmospheric air of any of the materials in common use. For illustrating my invention I have however selected for its simplicity an oblong cylindrical sheet iron stove, of which in the annexed drawings—

Figure 1, is a perspective view; Fig. 2 a bottom view; Fig. 3, a perpendicular cross section along lines $a$, $b$, of Fig. 1; and Fig. 4, a similar section along lines $c$, $d$, of Fig. 1.

Similar letters in the different figures indicate the same parts.

The form of the fire chamber and grate being selected, I construct around the same two or more shells parallel to each other and to the fire chamber and at distances proper to contain between them a sufficient layer of atmospheric air to intercept the sudden emination of heat.

In the stove selected for illustration, $m$, is the grate and the space above it the fire-place; the three shells surrounding said fire chamber constitute the walls of two atmospheric air jackets $o$, $o$, $o$, and $n$, $n$, $n$, which thus themselves surround the fire-chamber on all sides with exception of the following spaces, viz: the spaces to be reserved for the ash pit $k$, and stove door $i$, for the air vent $e$, for the smoke flue $h$, and for the supply of fuel in $l$. The shells being constructed of good conductors of heat the air jackets inclosed within them will as the air is one of the worst conductors of heat, absorb and retain all the heat evolved in the fire-chamber until set in communication with the atmosphere when every particle of hot air expelled from any of the air jackets will effectually lessen the temperature of the shell next surrounding it. To effect such communication I have provided every jacket with a valve as represented in $f$ and $g$. Thus agreeable to the principles of thermostatics it is clear that assuming a given supply of heat in the fire chamber, the outermost shell of the stove will be most heated when both air jackets $n$, $n$, $n$, and $o$, $o$, $o$, are closed. On opening the valve $f$, this shell will gradually cool down; on closing the valve $f$, and opening the valve $g$, the shell between the jackets $n$, $n$, $n$, and $o$, $o$, $o$, will cool down and consequently the outermost shell will cool down still more, and reach the lowest degree of temperature on both valves $f$, and $g$, being open; all this without interfering in the least with the source of the heat itself in the fire chamber. If more than two air jackets be used the radiation of heat from the outermost shell of the stove may be controlled to any degree of nicety, but I have found on experiment that two jackets are all sufficient for every practical purpose of daily life and even for the wants of the sick and the invalid. In fact the door $i$, and the air vent $e$, may be locked up so as to keep the fire out of the reach of children, deranged persons or animals, and the heat of the stove be nevertheless graduated to suit circumstances. But besides this advantage, never attained heretofore, my stove will show a great saving of fuel, as under no circumstances the heat once generated has to be wasted away, but may be concentrated within the fire chamber or as it were stored away as long as the fuel used admits of keeping the fire alive. For the latter purpose I have provided small holes in the damper $h$, instead of making the same nearly air tight when closed as usually employed, my stove permitting to keep the fire alive, with the outer shell of the stove as cool, as if there was not fire at all within.

I have to observe that my device is equally adaptable to any kind of fuel to be used, as to any form or size of stove to be selected and also that the usual accessory parts of stoves, viz, ash-pits supply doors, air vents and dampers, may be used with full effect and with all facility either independently or in combination therewith, so that a stove constructed with my improvement may retain all the advantages it otherwise possesses, the properties stated above unimpaired.

What I claim as my invention and desire to secure by Letters Patent is,

The surrounding the fire place of a stove of any size or form with at least two or more air tight jackets standing in no communication with each other, admitting no currents of heated air to circulate through them, and each of them provided with only one valve constructed and operated as described and for the purpose of controlling the radiation of heat from the outermost shell of the stove without interfering with the fire in the interior thereof.

JAMES B. MABURY.

Witnesses:
 OLIVER DUFOUR,
 GEO. A. C. CLARKE.